(12) United States Patent
Ueda et al.

(10) Patent No.: US 11,031,188 B2
(45) Date of Patent: Jun. 8, 2021

(54) SOLID ELECTROLYTIC CAPACITOR

(71) Applicant: Panasonic Intellectual Property Management Co., Ltd., Osaka (JP)

(72) Inventors: Masahiro Ueda, Saga (JP); Kenji Taki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 132 days.

(21) Appl. No.: 16/354,516

(22) Filed: Mar. 15, 2019

(65) Prior Publication Data

US 2019/0214199 A1 Jul. 11, 2019

Related U.S. Application Data

(63) Continuation of application No. PCT/JP2017/030023, filed on Aug. 23, 2017.

(30) Foreign Application Priority Data

Sep. 29, 2016 (JP) .............................. JP2016-190577

(51) Int. Cl.
*H01G 9/012* (2006.01)
*H01G 9/10* (2006.01)
(Continued)

(52) U.S. Cl.
CPC ............... *H01G 9/012* (2013.01); *H01G 9/08* (2013.01); *H01G 9/10* (2013.01); *H01G 9/15* (2013.01)

(58) Field of Classification Search
CPC .......... H01G 9/012; H01G 9/008; H01G 9/08; H01G 9/15
See application file for complete search history.

(56) References Cited

U.S. PATENT DOCUMENTS

| 6,229,688 B1 | 5/2001 | Kobayashi et al. |
| 2011/0051324 A1* | 3/2011 | Ihara ...................... H01G 9/012 361/540 |

FOREIGN PATENT DOCUMENTS

| JP | 4-192405 | 7/1992 |
| JP | 5-094927 | 4/1993 |

(Continued)

OTHER PUBLICATIONS

International Search Report of PCT application No. PCT/JP2017/030023 dated Nov. 21, 2017.

*Primary Examiner* — Eric W Thomas
(74) *Attorney, Agent, or Firm* — McDermott Will and Emery LLP

(57) ABSTRACT

A solid electrolytic capacitor includes a capacitor element, an anode frame, a cathode frame, and an exterior body. The capacitor element includes an anode body, a dielectric body disposed on a surface of the anode body, and a cathode part. The anode frame is electrically connected to the anode body. The cathode frame is electrically connected to the cathode part. The exterior body seals the capacitor element in a state that a part of the anode frame and a part of the cathode frame are exposed from the exterior body. At least one of the anode frame and the cathode frame has at least one groove on a surface adhered to the exterior body. The at least one groove intersects with an extending direction in which the anode frame or the cathode frame extends from the capacitor element to outside of the exterior body.

10 Claims, 6 Drawing Sheets

(51) Int. Cl.
*H01G 9/15* (2006.01)
*H01G 9/08* (2006.01)

(56) References Cited

FOREIGN PATENT DOCUMENTS

| | | |
|---|---|---|
| JP | 2000-299261 | 10/2000 |
| JP | 2001-057321 | 2/2001 |
| JP | 2006237195 A * | 9/2006 |

* cited by examiner

SOLID ELECTROLYTIC CAPACITOR

RELATED APPLICATIONS

This application is a continuation of the PCT International Application No. PCT/JP2017/030023 filed on Aug. 23, 2017, which claims the benefit of foreign priority of Japanese patent application No. 2016-190577 filed on Sep. 29, 2016, the contents all of which are incorporated herein by reference.

BACKGROUND

1. Technical Field

The present disclosure relates to a solid electrolytic capacitor including a capacitor element, an exterior body sealing the capacitor element, and an anode terminal and a cathode terminal both partially exposed from the exterior body. The capacitor element includes an anode body, a dielectric body, and a cathode part.

2. Description of the Related Art

As capacitors having a small size, a large capacitance, and low equivalent series resistance (ESR), such solid electrolytic capacitors are known that each include an anode part, a dielectric body formed on a surface of the anode part, and a cathode part covering at least a part of the dielectric body. In particular, promising candidates are solid electrolytic capacitors each including a cathode part containing conductive polymer as a solid electrolyte.

A solid electrolytic capacitor includes an exterior body sealing a capacitor element including an anode body, a dielectric body, and a cathode part. The exterior body protects the capacitor element and suppresses external moisture from entering.

On the other hand, the exterior body cannot fully prevent moisture from entering into the solid electrolytic capacitor. Therefore, the capacitor element is unavoidably affected by entering moisture. Unexamined Japanese Patent Publication No. 2000-299261 discloses provision of gas-venting micro-pores on an exterior body in order to prevent such a phenomenon that moisture inside a solid electrolytic capacitor evaporates at a time of reflow mounting, blowing off adjacent components, as well as to prevent a tombstone phenomenon. Unexamined Japanese Patent Publication No. 2001-57321 discloses provision, in a resin body constituting an exterior body, of an air discharge passage that is made of a material having higher permeability of water vapor than that of the resin body.

SUMMARY

A solid electrolytic capacitor according to an aspect of the present disclosure includes a capacitor element, an anode frame, a cathode frame, and an exterior body. The capacitor element includes an anode body, a dielectric body disposed on a surface of the anode body, and a cathode part. The anode frame is electrically connected to the anode body. The cathode frame is electrically connected to the cathode part. The exterior body seals the capacitor element in a state that a part of the anode frame and a part of the cathode frame are exposed from the exterior body. At least one of the anode frame and the cathode frame has at least one groove on a surface adhered to the exterior body. The at least one groove intersects with an extending direction in which the anode frame or the cathode frame extends from the capacitor element to outside of the exterior body.

According to the present disclosure, moisture can be suppressed from entering into a solid electrolytic capacitor.

DETAILED DESCRIPTION OF EMBODIMENT

Figure 1:
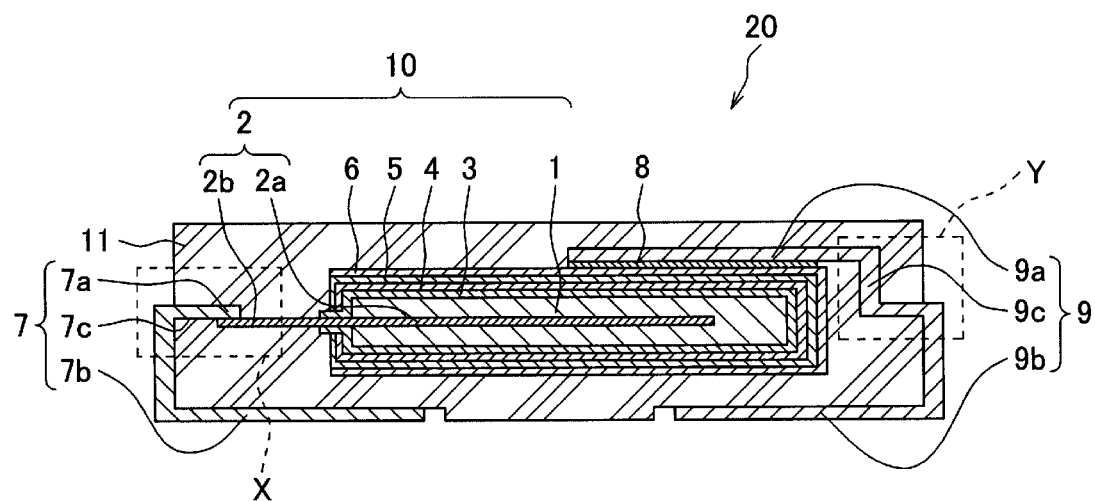
FIG. 1 is a longitudinal schematic sectional view illustrating an example of a solid electrolytic capacitor according to an exemplary embodiment of the present disclosure.

When an exterior body of a known solid electrolytic capacitor described above is provided with micro-pores or air discharge passages, the micro-pores or the air discharge passages serve as routes allowing external moisture to enter. Hence, it turns to be difficult to suppress the moisture from entering into the solid electrolytic capacitor. Once the moisture enters inside, the moisture tends to eccentrically lodge inside a capacitor element and around an interface between the capacitor element and the exterior body. The moisture may expand at a time of reflow mounting, increasing internal pressure. This might result in a poor appearance of the solid electrolytic capacitor.

The electrolytic capacitor according to the present disclosure includes a capacitor element, an anode frame, a cathode frame, and an exterior body. The capacitor element includes an anode body, a dielectric body formed on a surface of the anode body, and a cathode part. The anode frame is electrically connected to the anode body. The cathode frame is electrically connected to the cathode part. The exterior body seals the capacitor element in a state that a part of the anode frame and a part of the cathode frame are exposed from the exterior body. The part (exposed part) of the anode frame extends from the exterior body, and functions as an anode terminal. The part of (exposed part) of the cathode frame extends from the exterior body, and functions as a cathode terminal. At least one of the anode frame and the cathode frame (hereinafter the anode frame or the cathode frame will be sometimes simply referred to as the frame.) has at least one groove on a surface adhered to the exterior body. The at least one groove intersects with an extending direction of either of the frames.

In the frame, the surface adhered to the exterior body denotes a surface of a portion sealed by the exterior body. It is noted that the surface adhered to the exterior body denotes the surface of the portion sealed by the exterior body even if the frame and the exterior body are peeled off each other at the portion sealed by the exterior body.

The extending direction of the frame can be regarded as a direction of a straight line connecting a center of gravity of the capacitor element and a center of an end face of the exterior body where the frame starts to exposure from, for example. The extending direction of the frame is also a direction in which the frame extends from a connecting part between the frame and the capacitor element to outside of the exterior body.

A moisture moving path from outside to the capacitor element is often formed along an interface between the exterior body and the frame. Therefore, the extending direction of the frame corresponds to a moisture advancing direction in which moisture advances from outside to the capacitor element. By intersecting an extending direction of the groove with the extending direction of the frame, the extending direction of the groove and the moisture advancing direction intersect with each other. Hence, the groove prevents moisture from entering, or the moisture advancing direction changes along the extending direction of the groove. Therefore, moisture would be less likely to reach the capacitor element. Even when a moisture moving path is formed in the extending direction of the frame, the moving path does not extend linearly, but forms a detouring path along unevenness of the groove.

When a groove is provided on the surface adhered to the exterior body in the frame, a contact area between the exterior body and the frame increases, as well as an anchor effect occurs. As a result, the exterior body and the frame would be less likely to peel off each other, improving adhesiveness between the exterior body and the frame. Therefore, a moisture moving path is significantly suppressed from being formed.

With the effects of the groove described above, moisture is suppressed from entering into the solid electrolytic capacitor. As a result, such a poor appearance that would occur due to expansion of moisture at a time of reflow mounting would be less likely to occur on the solid electrolytic capacitor. Further, since internal pressure in the solid electrolytic capacitor is also suppressed from increasing, a leak current can be suppressed to occur. Additionally, ESR due to entered moisture can also be suppressed from increasing.

The extending direction of the groove and the extending direction of the frame may preferably be orthogonal to each other. However, a smaller angle of angles formed between the extending direction of the groove and the extending direction of the frame, that is, an angle $\theta$, may be $45° \leq \theta < 90°$. However, when $\theta$ approaches 90°, the effect of suppressing moisture from entering into the solid electrolytic capacitor improves.

The groove may be straight or curved, or may have a shape including a straight portion and a curved portion. The extending direction of the groove can be defined as a direction of a straight line connecting one end of the groove and the other end of the groove even when the groove takes anyone of the above shapes. Hence, the extending direction of the groove can be unambiguously determined.

Distance L of the straight line connecting one end of the groove and the other end of the groove may be longer as much as possible in terms of improving the effect of suppressing moisture from entering into the solid electrolytic capacitor. Distance L may preferably be 10% or greater of width W in a direction vertical to the extending direction of the frame, and a relation of L=W may be more preferable.

Depth d of the groove may range from 1% to 80%, inclusive, of thickness T of the frame in terms of keeping strength of the frame fully higher. Groove width w may preferably not be so wide in terms of improving the effects of preventing moisture from entering and changing a moisture advancing direction. Groove width w may preferably range from 1 μm to 100 μm, inclusive, and may more preferably range from 1 μm to 40 μm, inclusive, for example. It is noted that groove width w denotes a maximum width at an opening of the groove.

When grooves are increased in number, the effect of preventing moisture from entering or changing a moisture advancing direction improves. In addition, adhesiveness between the exterior body and the frame easily improves, as well as a detouring path extends longer. A number of grooves may range from 1 to 100, inclusive, for example, in terms of keeping the strength of the frame fully higher. A plurality of grooves may preferably not intersect with each other in terms of suppressing moisture from moving as much as possible within the grooves.

The solid electrolytic capacitor according to the exemplary embodiment of the present disclosure will now be described herein with reference to FIG. 1. FIG. 1 is a schematic sectional view illustrating an example of the solid electrolytic capacitor.

<Solid Electrolytic Capacitor>

Solid electrolytic capacitor 20 includes capacitor element 10, exterior body 11 sealing capacitor element 10, anode frame 7 having a part exposed to outside of exterior body 11, and cathode frame 9 having a part exposed to outside of exterior body 11. Capacitor element 10 includes anode body 1 that is a porous sintered body, anode lead 2, dielectric layer 3 disposed on a surface of anode body 1, solid electrolyte layer 4 disposed on a surface of dielectric layer 3, and a cathode part (conductive carbon layer 5 and silver paste layer 6) disposed on a surface of solid electrolyte layer 4.

Embedded part 2a including an end of anode lead 2 is embedded in anode body 1 from a surface of anode body 1. Extended part 2b including another end of anode lead 2 is electrically connected, through welding, for example, to anode connecting part 7a of anode frame 7 which is sealed by exterior body 11. On the other hand, the cathode part is electrically connected, via conductive adhesive material 8 (e.g., a mixture of a thermosetting resin and metal particles), to cathode connecting part 9a of cathode frame 9 which is sealed by exterior body 11.

Anode frame 7 includes anode connecting part 7a, anode terminal 7b exposed to outside of exterior body 11, and intermediate part 7c between anode connecting part 7a and anode terminal 7b. Cathode frame 9 includes cathode connecting part 9a, cathode terminal 9b exposed to outside of exterior body 11, and intermediate part 9c between cathode connecting part 9a and cathode terminal 9b. Intermediate part 7c of anode frame 7 and intermediate part 9c of cathode frame 9 are sealed by exterior body 11. Both surfaces of each of the intermediate parts are adhered to the exterior body.

Anode terminal 7b and cathode terminal 9b are respectively drawn out from different side faces of exterior body 11, and extend to one main flat face (lower face in FIG. 1). Exposed portions of the terminals on the flat face are used for solder connection, for example, to a substrate (not illustrated) on which solid electrolytic capacitor 20 is to be mounted.

The following description will explain a case when grooves are provided on intermediate part 7c of anode frame 7 or intermediate part 9c of cathode frame 9. Meanwhile, grooves may be provided on anode connecting part 7a and/or cathode connecting part 9a. An example described below does not intend to limit a location to be provided with grooves.

Figure 2:
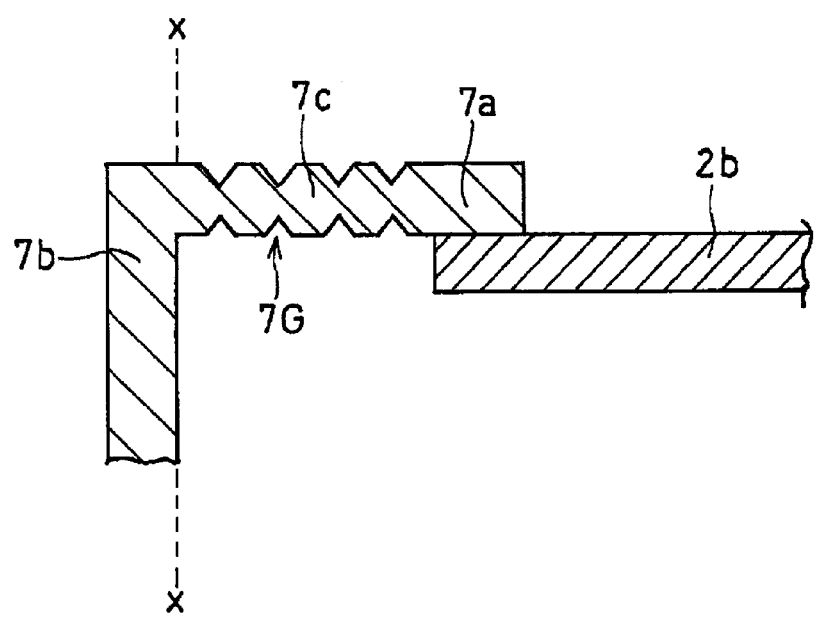
FIG. 2 is an enlarged cross-sectional view illustrating a main part of an anode frame.
Figure 3:
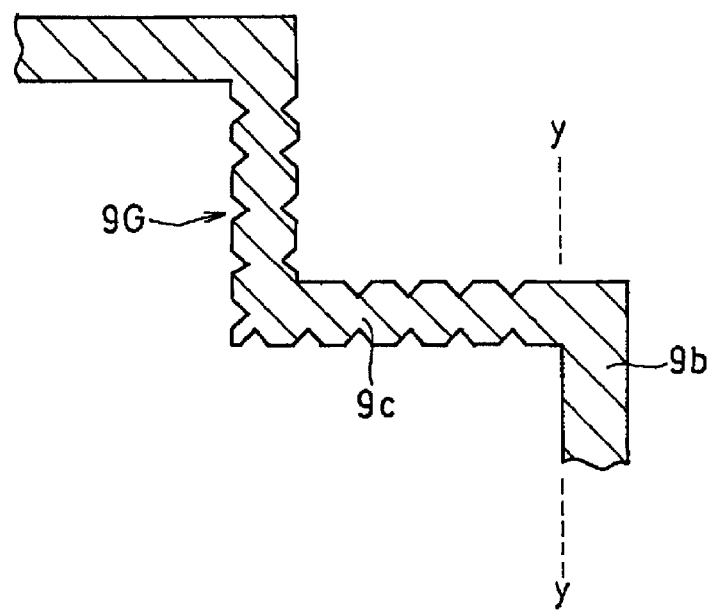
FIG. 3 is an enlarged cross-sectional view illustrating a main part of a cathode frame.

FIG. 2 is an enlarged cross-sectional view illustrating a main part of anode frame 7 (an area surrounded by broken line X in FIG. 1, showing intermediate part 7c). Broken line x in FIG. 2 illustrates a boundary between intermediate part 7c and the exposed part (anode terminal 7b) of anode frame 7. FIG. 3 is an enlarged cross-sectional view illustrating a main part of cathode frame 9 (an area surrounded by broken line Y in FIG. 1, showing intermediate part 9c). Broken line y in FIG. 3 illustrates a boundary between intermediate part 9c and the exposed part (cathode terminal 9b) of cathode frame 9.

Each of intermediate part 7c and intermediate part 9c is a portion at which front and back principal surfaces of each of the frames are both adhered to exterior body 11 or face exterior body 11. In exterior body 11, intermediate part 7c is disposed outside farther than anode connecting part 7a. Hence, by forming grooves 7G on intermediate part 7c, moisture can be prevented from entering or a moisture advancing direction can be changed at a more distal position from capacitor element 10 (at a more proximal position to broken line x). Similarly, in exterior body 11, intermediate part 9c is disposed at a portion outside farther than cathode connecting part 9a (i.e., a portion of cathode frame 9, at which the cathode part is not joined). Hence, by forming grooves 9G on intermediate part 9c, moisture can be prevented from entering or a moisture advancing direction can be changed at a more distal position from capacitor element 10 (at a more proximal position to broken line y).

Figure 4A:
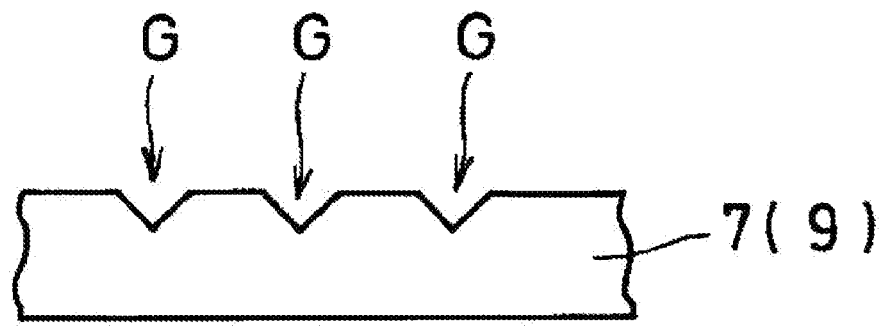
FIGS. 4A and 4B are enlarged cross-sectional views illustrating variations of a main part of a frame.
Figure 4B:
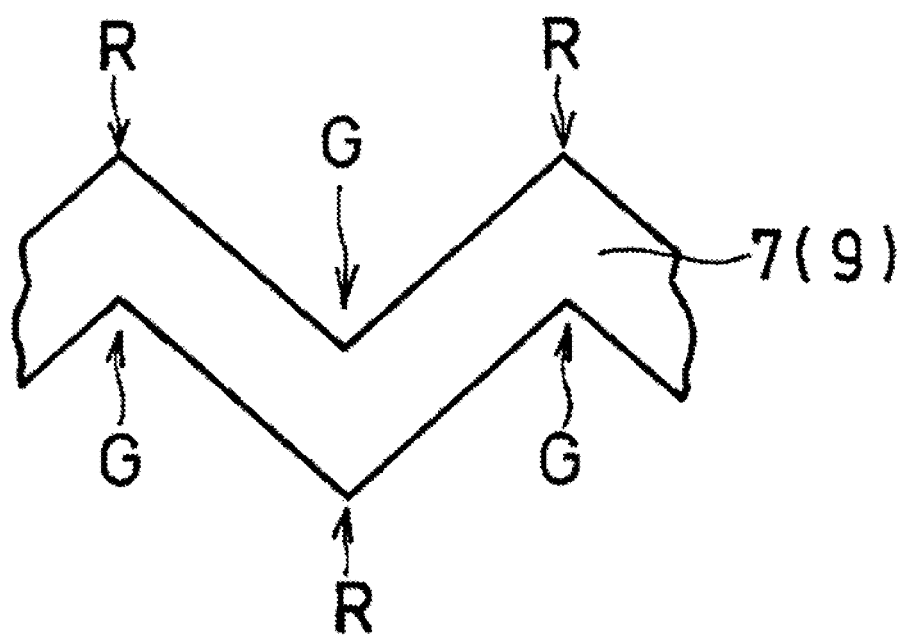

In FIGS. 2 and 3, a shape of grooves 7G and grooves 9G in cross-sectional view vertical to the extending direction of grooves 7G and grooves 9G is a wedge shape, but, a cross-sectional shape of a groove is not particularly limited. Grooves 7G and grooves 9G are respectively formed on both main surfaces of each of intermediate part 7c and intermediate part 9c, but, as illustrated in an enlarged cross-sectional view in FIG. 4A, grooves G may be formed on only one of the main surfaces of frame 7 (9). As illustrated in an enlarged cross-sectional view in FIG. 4B, wave forms may be press-worked onto frame 7 (9) to alternately form grooves G and ribs R.

Figure 5A:
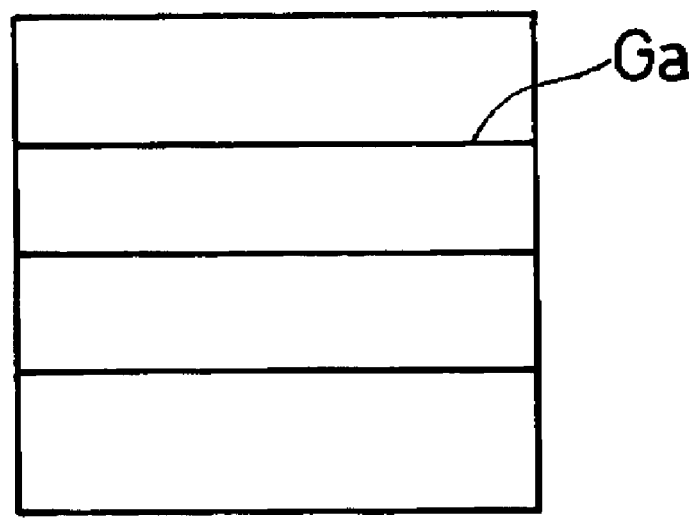
FIGS. 5A to 5D are plan views of the main parts of the frame, illustrating variations of groove shapes.
Figure 5B:
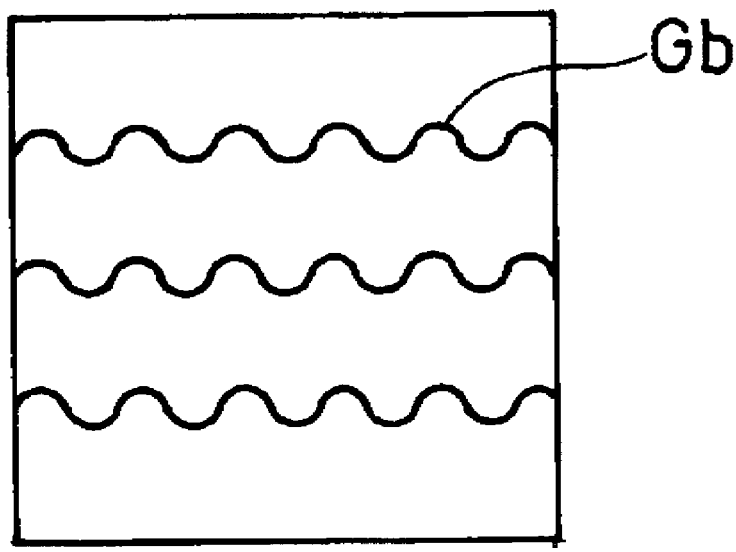
Figure 5C:
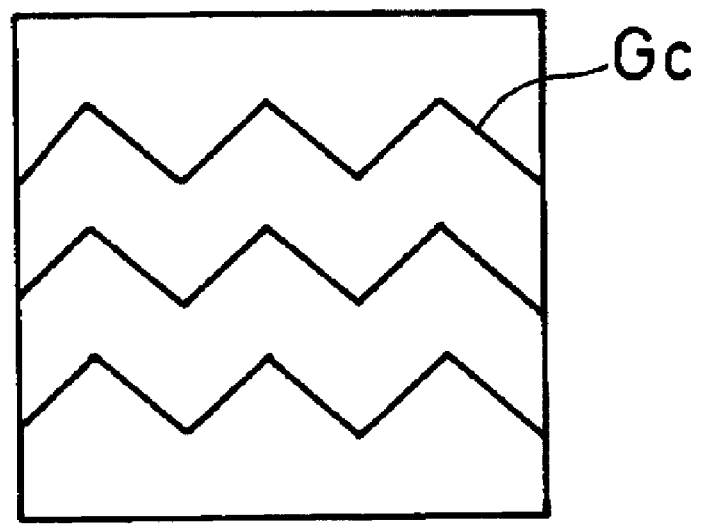
Figure 5D:
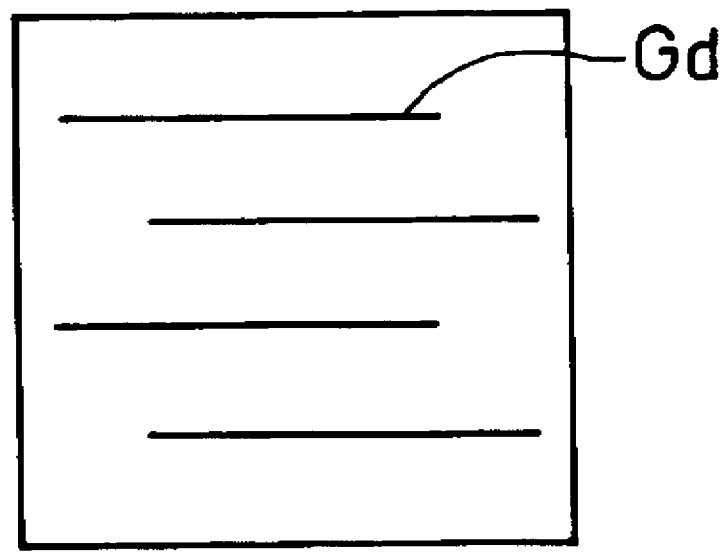

A groove shape (a shape along the extending direction of the groove itself) is not also particularly limited. Grooves Ga each having a straight shape as illustrated in a conceptual plan view in FIG. 5A may be applicable. Grooves Gb each having a wavy shape as illustrated in a conceptual plan view in FIG. 5B may be applicable. Grooves Gc each having a zigzag shape as illustrated in a conceptual plan view in FIG. 5C may be applicable. As illustrated in a conceptual plan view in FIG. 5D, grooves Gd may be formed shorter than width W of frame 7 (9), or may be disposed in a staggered manner.

Exterior body 11 may be preferably include a composite material of a resin and an inorganic filler, as long as the composite material is an insulating material capable of sealing capacitor element 10. The composite material can be finely adhered to the frames, and is superior in strength and dimensional stability. When the inorganic filler has a form of particles, an average particle diameter of the particles may preferably be greater than groove width w (i.e., maximum width). In this case, particles of the inorganic filler each have such a size that the particles would be less likely to enter into grooves. Hence, the grooves are preferentially filled with the resin, allowing adhesiveness between the exterior body and the frames to be easily improved.

Figure 6A:
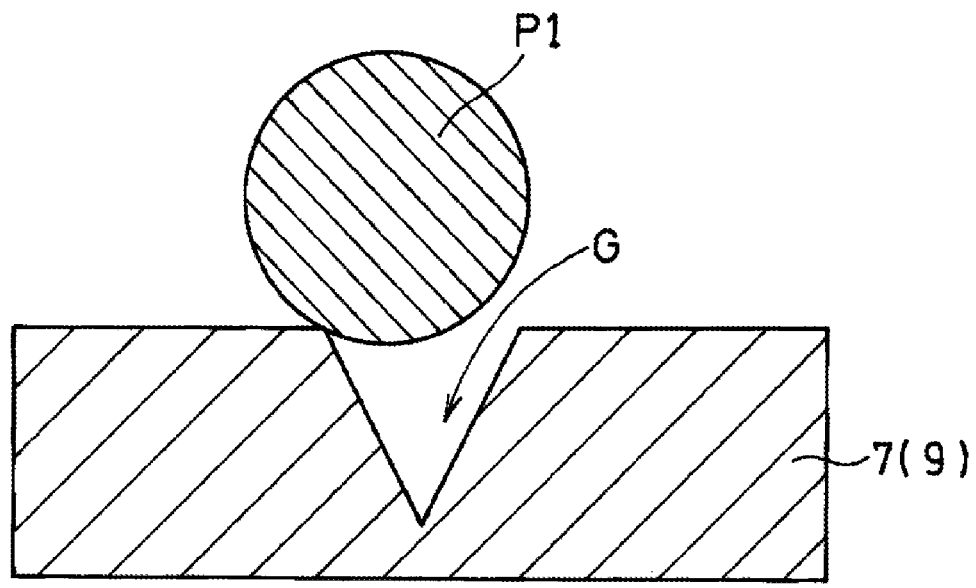
FIGS. 6A and 6B are conceptual diagram illustrating relationships between size of one of particles of inorganic fillers and width of one of grooves.
Figure 6B:
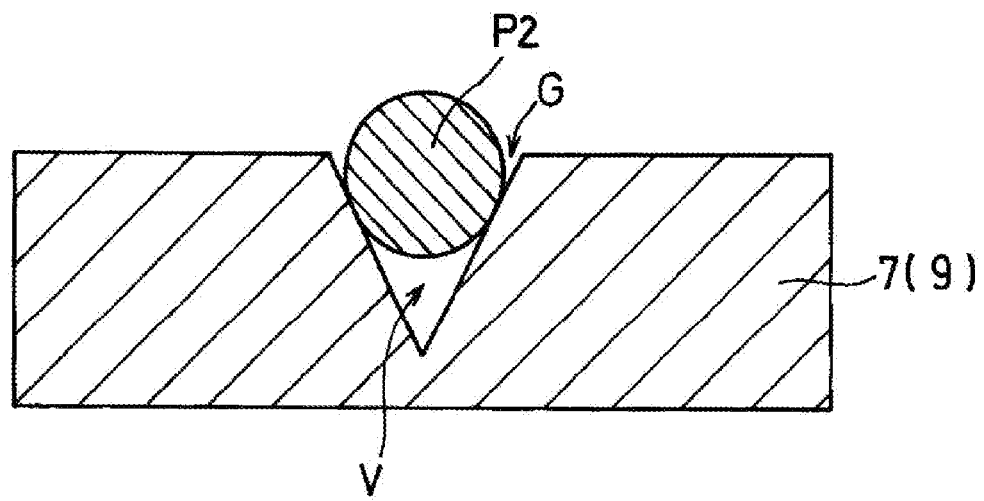

FIGS. 6A and 6B are conceptual views illustrating relationships between sizes of each of particles P1, P2 of the inorganic fillers and widths of each of grooves G. Particle P1 illustrated in FIG. 6A has particle diameter D1 greater than groove width w. Particle P2 illustrated in FIG. 6B has particle diameter D2 smaller than groove width w. Particle P1 cannot enter into each of grooves G. With such a method as a transfer molding where pressure is applied, openings of grooves G will not be clogged with particles, but a resin is filled fully to bottoms of grooves G. On the other hand, particle P2 can enter into each of grooves G. Thus, particle P2 is caught in each of grooves G. Therefore, even when pressure is applied, particle P2 is still caught in each of grooves G, and thus cannot move. Hence, the resin would be less likely to be filled fully to the bottoms of grooves G. Accordingly, void V surrounded by particle P2 and each of grooves G can be easily formed in each of grooves G. When void V is formed, moisture can easily condense in void V.

In terms of reducing voids in which moisture can easily condense, average particle diameter D of the particles may preferably range from 1 times to 100 times, inclusive, of groove width w, and may more preferably range from 2 times to 10 times, inclusive.

The exterior body is formed through transfer molding, for example. As the insulating material, a thermosetting resin that cures at a time of transfer molding may preferably be used. Examples of the thermosetting resin include epoxy resin, phenol resin, silicone resin, melamine resin, urea resin, alkyd resin, polyurethane, polyimide, polyamide-imide, and unsaturated polyester.

Next, main components of the capacitor element will be described herein.

(Anode Body)

Anode body 1 is a porous sintered body obtained by sintering powder of a valve metal or powder of an alloy containing a valve metal, for example. Anode body 1 is prepared by pressure-molding powder of a valve metal into a hexahedron, and sintering the hexahedron, for example. At this time, by performing the pressure-molding and sintering on embedded part 2a of anode lead 2 embedded in the hexahedron, extended part 2b can be drawn out from one face of anode body 1.

As a material that constitutes anode body 1, there can be used one or two or more in combination of valve metals such as titanium (Ti), tantalum (Ta), and niobium (Nb). An oxide of a valve metal has a high dielectric constant and is therefore suitable as a constituent material of the anode body. The materials may also be an alloy made of two or more metals.

(Anode Lead)

Anode lead 2 is formed of, for example, a conductive wire. A valve metal may be also preferable as a conductive material constituting anode lead 2. The materials that constitute anode body 1 and anode lead 2 may be the same kind or different kinds.

(Dielectric Layer)

Dielectric layer 3 is formed, by anodizing the surface of anode body 1 through an anodizing treatment, for example. The anodization may be performed by a publicly known method. Dielectric layer 3 is not particularly limited, but may be any insulating layer functioning as a dielectric body.

(Solid Electrolyte Layer)

Solid electrolyte layer 4 is formed on at least a part of the surface of dielectric layer 3. Solid electrolyte layer 4 contains, for example, a manganese compound and a conductive polymer. Examples of the conductive polymer include polypyrrole, polythiophene, polyaniline, and derivatives of polypyrrole, polythiophene, and polyaniline Solid electrolyte layer 4 containing a conductive polymer can be formed through, for example, chemical polymerization and/or electrolytic polymerization of raw material monomer on the surface of dielectric layer 3.

(Cathode Part)

The cathode part includes, for example, carbon layer 5, and metal (e.g., silver) paste layer 6 disposed on a surface of carbon layer 5. However, a configuration of the cathode part is not limited to this example. Such a configuration may be adopted that has a current collection function.

The present disclosure can be applied to various solid electrolytic capacitors. In particular, the present disclosure can be applied to chip-type solid electrolytic capacitors each including an anode body having a tantalum-powder sintered body. In the solid electrolytic capacitor according to the present disclosure, moisture would be less likely to enter. Therefore, the solid electrolytic capacitor may preferably undergo reflow mounting under a high temperature.

What is claimed is:

1. A solid electrolytic capacitor comprising:
   a capacitor element including an anode body, a dielectric body disposed on a surface of the anode body, and a cathode part;
   an anode frame electrically connected to the anode body;
   a cathode frame electrically connected to the cathode part; and
   an exterior body sealing the capacitor element in a state that a part of the anode frame and a part of the cathode frame are exposed from the exterior body, wherein:
   at least one of the anode frame and the cathode frame has a plurality of grooves on a surface adhered to the exterior body, each of the plurality of grooves intersecting with an extending direction in which the anode frame or the cathode frame extends from the capacitor element to outside of the exterior body, and
   the plurality of grooves are disposed on an intermediate part of the at least one of the anode frame and the cathode frame, the intermediate part having principal surfaces both of which adhere to the exterior body or face the exterior body, the principal surfaces of the intermediate part being opposite to each other.

2. The solid electrolytic capacitor according to claim 1, wherein the plurality of grooves do not intersect with each other.

3. The solid electrolytic capacitor according to claim 1, wherein:
   the exterior body includes a composite material of a resin and an inorganic filler,
   the inorganic filler has a form of particles, and
   an average particle diameter of the particles is greater than a width of the each of the plurality of grooves.

4. The solid electrolytic capacitor according to claim 1, wherein:
   the cathode frame has a cathode connecting part and the intermediate part, the cathode connecting part being joined to the cathode part, the intermediate part being not joined to the cathode part,
   the intermediate part is disposed at a position outside farther than the cathode connecting part in the extending direction, and
   the plurality of grooves are disposed on the intermediate part of the cathode frame.

5. The solid electrolytic capacitor according to claim 1, wherein:
   the capacitor element includes an anode lead having an end embedded in the anode body,
   another end of the anode lead is welded to an anode connecting part of the anode frame, and
   the plurality of grooves are disposed on the intermediate part of the anode frame, the intermediate part being outside of the anode connecting part of the anode frame.

6. The solid electrolytic capacitor according to claim 1, wherein the at least one of the anode frame and the cathode frame has a smaller thickness at the each of the plurality of grooves than at a part adjacent to the each of the plurality of grooves.

7. A solid electrolytic capacitor comprising:
   a capacitor element including an anode body, a dielectric body disposed on a surface of the anode body, and a cathode part;
   an anode frame electrically connected to the anode body;
   a cathode frame electrically connected to the cathode part; and
   an exterior body sealing the capacitor element in a state that a part of the anode frame and a part of the cathode frame are exposed from the exterior body, wherein:
   at least one of the anode frame and the cathode frame has at least one groove on a surface adhered to the exterior body, the at least one groove intersecting with an extending direction in which the anode frame or the cathode frame extends from the capacitor element to outside of the exterior body,
   the exterior body includes a composite material of a resin and an inorganic filler,
   the inorganic filler has a form of particles, and
   an average particle diameter of the particles is greater than a width of the at least one groove.

8. The solid electrolytic capacitor according to claim 7, wherein the at least one of the anode frame and the cathode frame has a plurality of grooves including the at least one groove, the plurality of grooves being not intersecting with each other.

9. The solid electrolytic capacitor according to claim 7, wherein:
   the cathode frame has a cathode connecting part and an intermediate part, the cathode connecting part being joined to the cathode part, the intermediate part being not joined to the cathode part,
   the intermediate part is disposed at a position outside farther than the cathode connecting part in the extending direction, and
   the at least one groove is disposed on the intermediate part of the cathode frame.

10. The solid electrolytic capacitor according to claim 7, wherein:
   the capacitor element includes an anode lead having an end embedded in the anode body,
   another end of the anode lead is welded to an anode connecting part of the anode frame, and
   the at least one groove is disposed on an intermediate part of the anode frame, the intermediate part being outside of the anode connecting part of the anode frame.

* * * * *